July 30, 1963   G. R. PURIFOY   3,099,751
MOTOR GENERATOR SET CONTROL SYSTEM
Filed Aug. 31, 1959
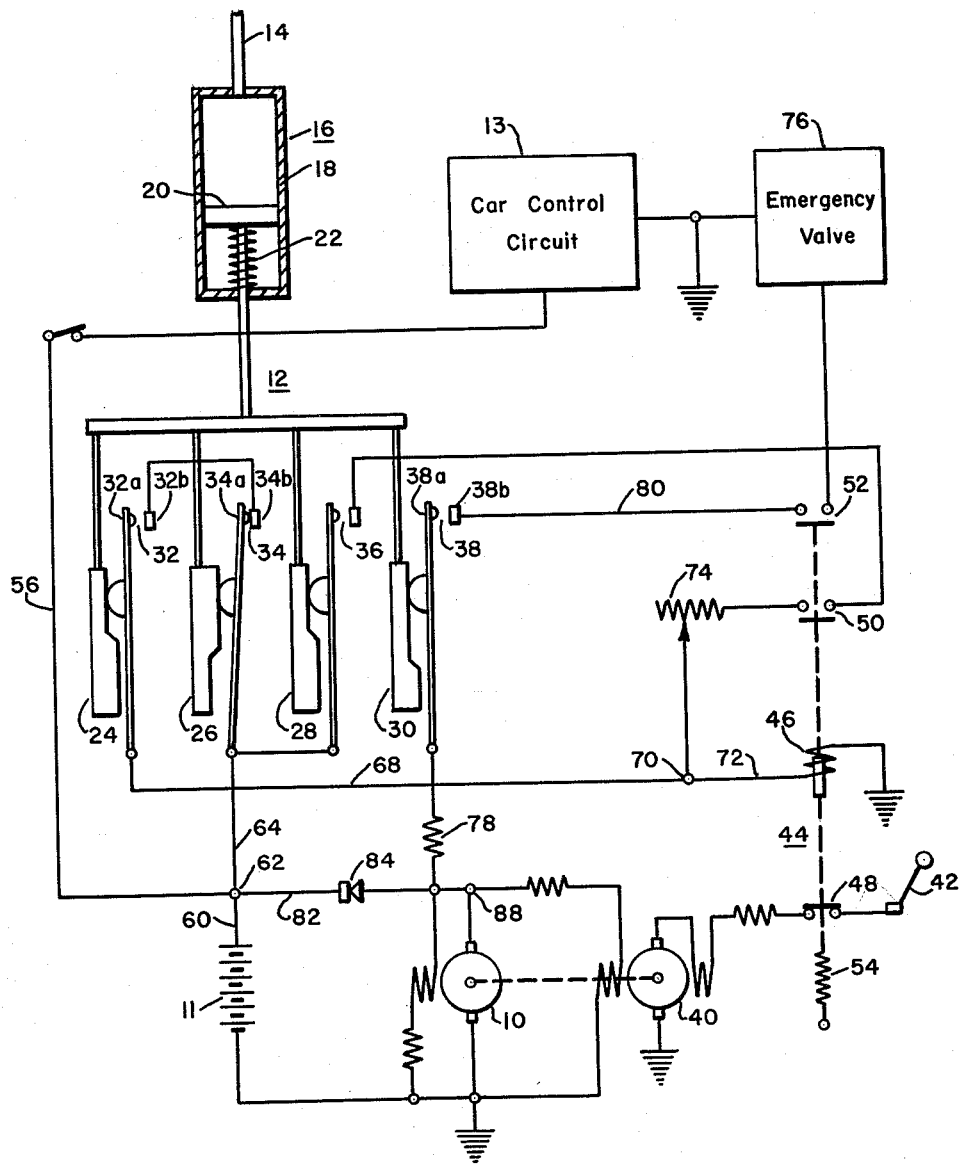
WITNESSES
Leon J. Daja
E. Herbert Liss
INVENTOR
George R. Purifoy
BY
ATTORNEY

United States Patent Office 3,099,751
Patented July 30, 1963

3,099,751
MOTOR GENERATOR SET CONTROL SYSTEM
George R. Purifoy, Forest Hills, Pa., assignor to Westinghouse Electric Corporation, East Pittsburgh, Pa., a corporation of Pennsylvania
Filed Aug. 31, 1959, Ser. No. 836,978
6 Claims. (Cl. 307—9)

The present invention relates to a voltage supply system, and more particularly, to a low voltage supply system for auxiliary equipment of railway vehicles.

With electrically operated railway vehicles, and particularly rapid transit equipment for which this invention is particularly intended, it is desirable to operate the traction motors at relatively high voltage, such as 600 volts direct current. However, it is not economical to operate auxiliary equipment, marker lights, relays and certain other portions of the equipment from a source of voltage as high as that required for the traction and compressor motors, nor is the line voltage constant enough to properly operate calibrated equipment, controller motors or indicators. Therefore, motor generator sets have been operated on these vehicles to reduce the line voltage to a lower voltage which may be controlled easily and accurately at a voltage such as 40 volts for operating auxiliary equipment. These motor generators have been designed to be most efficient during the operation of the normal load of the vehicle in service.

However, unlike regular locomotive service, rapid transit equipment is all in service during rush peak load hours and most cars are out of service at other times. During the out of sevice or "standby" periods, it is essential that each of the vehicles have marker lights energized as well as certain other safety devices. Obviously, when a car is out of service, it is not necessary to provide the maximum power of the motor-generator set. Therefore, it has proved most economical to provide a battery for energizing the marker lights and various other equipment of the vehicle when out of service. The batteries are also essential to provide control voltage and emergency lighting in the event of power failure which sometimes occur. As most rapid transit vehicles are out of service over a weekend, a continual drain on the batteries would discharge them resulting in much effort and expense when returning the trains to service. In order to prevent the batteries from being discharged by this continuous drain during long standby periods, it has been the practice to provide a resistance connection to the high voltage source which will provide enough current to run the safety equipment and keep the battery charged. These resistors not only increase the initial cost of the equipment, the losses in the transit system, and add weight to be hauled by the traction motor, but also create special problems such as heating the floors of the vehicles so that insulation baffles or other cooling means must be used to prevent customer complaints.

Because of the fact that the safety of the passenger is of primary importance, it is necessary to provide a means for stopping the train qnickly with a minimum of damage. It has been found that simply venting the air brake system from a single valve, although it will stop the train, will stop individual cars at different times. Such a stopping procedure may result in certain of the vehicles remaining in power connections while others have their brakes applied. Thus, damaging stresses may occur in the couplings. This has resulted in the practice of dumping or venting the air from all units simultaneously. In the present invention, an emergency valve is provided which is actuated by the decaying current of the generator of the motor-generator set. However, it is essential that the emergency valve is not energized when it is desired to start the train because statutes and other regulations require that air pressure be available to stop the train before it may be started. Interlocking connections prevent operation of the equipment before air pressure is again available.

In prior art constructions many delays and much expense occurred because when battery voltage became low it was necessary for a mechanic to close the motor-generator set starting contactor manually. This created many delays and expense because the starting contactor is generally found under the train in a relatively inaccessible position.

A principal object of the present invention is to provide a simple and economical voltage supply system for auxiliary equipment in railway vehicles.

Another object of the present invention is to provide a simple and economical voltage supply system for auxiliary equipment in railway vehicles in which a battery is utilized to supply power for emergency lights and other auxiliary equipment and in which power is always available to the motor of a motor-generator set in order to maintain the battery in a charged condition.

A further object of this invention is to provide a voltage supply for auxiliary equipment in railway vehicles in which a motor in the motor-generator set will automatically be started when the battery is discharged if a source of power supply is available.

Other objects and advantages of the invention will be understood from the following detailed description, taken in conjunction with the drawing, the single FIGURE of which is a schematic diagram of a voltage supply embodying the invention.

Referring now to the drawing, there is shown a simplified control circuit which is particularly applicable to railway vehicles and especially rapid transit equipment. The generator 10 is provided to supply direct current to various auxiliary devices including a battery 11, vehicle door control devices, safety marker lights, etc., all included in the car control circuit 13. An emergency relay 12 is shown which is connected in the brake pipe air supply through a pipe 14. The emergency relay 12 operates in the event of an air brake emergency operation such as a track trip, dead-man's brake operation, conductor valve brake operation, or brake handle-off position. Connected in the brake pipe air supply is a valve 16 including a cylinder 18 and a piston 20. The piston 20 is biased upwardly by a compressed spring 22 as seen in the drawing and is held in the downward position by pressure in the air-brake supply system. The piston 20 is operatively connected to a plurality of cams 24, 26, 28 and 30. The cams 24, 26, 28 and 30 actuate contacts 32, 34, 36 and 38, in a predetermined sequence as will be hereinafter described. The generator 10 is driven by motor 40 which is supplied by a direct current voltage source through a trolley 42 or other suitable means. Usually, this motor is supplied from a 600 volt source of power.

There is shown in the drawing a relay 44 which includes a coil 46 and contacts 48, 50 and 52. Contacts 48 are normally closed and contacts 50 and 52 are normally open. The contacts are held in their normal position by a spring 54. When the coil 46 is energized contacts 48 move to an open position while contacts 50 and 52 are closed. Thus, it can be seen that energization of the coil 46 opens the contacts 48 and closes contacts 50 and 52. When the coil 46 is deenergized, contacts 48 are spring closed and contacts 50 and 52 are opened.

The battery 11 supplies power to safety marker lights and other equipment in the car control circuit 13 in the following manner. A lead 60 from a positive terminal of the battery connects the battery to point 62 and the car control circuit is connected to point 62 through a lead 56. Other circuits may be connected to the battery if desired. Contacts 32 and 34 hereinabove described are connected across the battery 11 through the coil 46 in the following manner: movable contact 34a of contact 34 is connected to the positive terminal of the battery 11 through a lead 64, point 62 and lead 60. The stationary contact 34b of contact 34 is connected through a lead 66 to stationary contact 32b of the contact 32. Movable contact 32a of contact 32 is connected through lead 68 to point 70 and point 70 is connected through lead 72 and coil 46 to ground. Contact 36 associated with the emergency relay 12 and contact 50 of relay 44 are connected in series through a resistor across contacts 32 and 34. The contact 48 of relay 44 connects the motor 40 to its source of power 42. The emergency valve 76 is connected to the positive terminal of the generator 10 through a resistor 78, movable contact 38a of contacts 38 associated with emergency relay 12, thence through stationary contact 38b of contact 38 to lead 80 and through contact 52 of relay 44. The generator 10 is connected to the positive terminal of the battery 11 through lead 60, point 62, lead 82, blocking rectifier 84, and lead 88 to the positive terminal of generator 10. The other side of the generator is connected to ground.

When in the position shown in the drawing, the emergency relay is supplied with sufficient pressure. Under these circumstances, contacts 32, 36 and 38 are opened while contact 34 is closed. Contacts 52 and 50 are open and contact 48 is closed. The circuit shown in the drawing is employed on each car. Therefore each car has its own emergency valve 76. An emergency operation on any car will vent the air through outlet 14 of each cylinder 18 resulting in smooth, safe stopping of the train. Shown in the drawing, the relay coil 46 is deenergized thus connecting the motor 40 to its source of power. Should an emergency air brake application occur due to a track trip, dead man's stop, a conductor's value, or any of the other various means by which an emergency operation may occur on any car, the cylinder 18 of each car will be vented. Upon venting of the emergency relay 12, the cams shown in the diagram will move to an upward position. As the piston moves from the lower or in-position to the upper or out-position, the contacts 32 and 36 will move to a closed position. The contact 34 will then move to an open position. There will be an overlapping between the closing of contacts 32 and 36 and the opening of contact 34 so that for a predetermined length of time the contacts 32, 34 and 36 will all be closed. Closing of the contacts 32 and 34 will result in closing the circuit from the positive side of the battery and generator through contacts 34 and 32 and through the coil 46 to ground. Thus the coil 46 will be energized thereby opening contact 48, and deenergizing the motor 40 which drives generator 10. This will also close contacts 50 and 52 of the relay 44.

Subsequent to the opening of contact 34, contact 38 will close. Thus the circuit from the positive terminal of the generator to the emergency valve will be closed. Opening of contact 34 will open the circuit through the relay coil 46. However, since the contacts 36 and 50 are closed the coil will remain energized through resistor 74. The decay voltage of the generator serves to energize the emergency valve 76 of each car. Since contacts 52 and 48 are interlocked and since contact 52 is closed only when contact 48 is opened and coil 46 is energized, no power can be supplied to the motor which drives the generator until the air-brake system is pumped up again.

The resistor 74 is so adjusted as to supply sufficient current through coil 46 to energize it so long as the battery is adequately charged. The resistor 74 is set to drop out the relay 44, thereby deenergizing it, at from 23 to 30 volts. The resistor 74 may be adjusted to give a drop out at any predetermined battery voltage. When the drop out occurs and the relay coil 44 is deenergized, the contact 48 will be returned to its normal spring-closed position, thus connecting the motor 40 which drives the generator 10 to its source of power. The deenergization of coil 46 will in turn open the contacts 50 and 52. The contact 52 which is in the emergency valve circuit remains open until such time as the air brake system is recharged. Thus power is supplied to the motor 40 but no power is supplied to the emergency valve 76. The motor will run continuously until it is shut down by opening a power switch to the motor generator set. This operation keeps the battery in a full charged condition.

In recharging the air brake system after an air emergency, contact 38 opens first thus preventing an air emergency before the air brake system is fully charged. Next the contact 34 is closed and following this contacts 32 and 36 are opened simultaneously. When the system is fully charged the circuit through the coil 46 is opened and power is supplied to the motor generator set. In this condition the system is now ready for an air emergency operation.

It will now be apparent that a voltage supply system for railway vehicles has been provided which has very desirable characteristics. It is a simple, economical system which eliminates the necessity of closing the motor generator set starting contactor manually, thus eliminating delays and expense. Because the contacts 48 on the relay 44 are normally closed when the coil 46 is deenergized the motor-generator set will start automatically when a source of power is available. Thus, if the car has been standing for some time and the battery is completely discharged, the motor will start automatically, when the trolley 42 engages a source of power. It is positive in operation in that power is always available to the motor of the motor generator set except in the event of an emergency air brake application. Each car in a train of cars functions individually and no extra train line wires are required. The emergency valve for operating the air brake system is not energized when air pressure is not available to stop the train. This complies with statutes and other regulations which make it essential that air pressure be available to stop the train before it may be started.

A particular embodiment of the invention has been shown and described for the purpose of illustration, but it will be apparent that various modifications and other embodiments are possible within the scope of the invention. It is to be understood therefore that the invention is not limited to the specific embodiments shown for the purpose of illustration but includes all equivalent embodiments and modifications.

I claim as my invention:

1. A voltage supply system for a vehicle comprising a motor-generator set, a battery in circuit with said generator and charged thereby, an air-brake emergency valve connected to the output of said generator, spring closed contact means magnetically opened, connecting said motor to a power supply, means connecting said output to said emergency valve through a pair of normally open contact means, magnetically opened, connecting said motor in response to an air-brake emergency operation for opening said spring closed contact means and closing said pair of normally open contact means, and means to reopen one of said normally open contact means after a brake operation while the pressure in the air brake system is still insufficient to operate the braking system.

2. A voltage supply system for a vehicle comprising a motor-generator set, a battery in circuit with said generator and charged thereby, an air-brake emergency valve connected to the output of said generator, spring closed contact means including coil means for opening said contact means when said coil means is energized, said motor being connected to a power supply through said spring closed contact means, normally open contact means connecting said output to said emergency valve, means responsive to an air-brake emergency operation for opening said spring closed contact means and closing said normally open contact means, and means to deenergize said coil means to reclose and spring closed contacts when said battery voltage drops to any value below a predetermined value.

3. A voltage supply system for a vehicle comprising a motor-generator set, a battery in circuit with said generator and charged thereby, an air-brake emergency valve connected to the output of said generator, spring closed contact means including coil means for opening said contact means when said coil means is energized, said motor being connected to a power supply through said spring closed contact means, a pair of normally open contact means connecting said output to said emergency valve, means responsive to an air-brake emergency operation for energizing said coil means to open said spring closed contact means and closing said pair of normally open contact means, means to reopen one of said pair of normally open contact means after a brake operation while the pressure in the air brake system is still insufficient to operate the braking system, and means to deenergize said coil means for reclosing said spring closed contacts when said battery voltage drops to value below a preselected value.

4. A voltage supply system for a vehicle comprising a motor generator set, a battery in circuit with said generator and charged thereby, said battery and said generator adapted to supply power to auxiliary equipment, an emergency air-brake system operable to apply braking power when said system is vented, an electrically operated emergency valve responsive to decaying generator voltage for venting said system, a train line connected to the output of said generator for actuating said valve, a fluid actuated means for deenergizing said train line when the pressure in the airbrake system is below a predetermined value, spring closed magnetically opened contactor, said motor being connected to a power source through said spring closed contactor, a coil for actuating said contactor means to open position when said coil is energized to open when said air brake system is vented and means for deenergizing said coil when said battery voltage is below a predetermined value.

5. A voltage supply system for a vehicle including an air-brake system comprising a motor drivingly engaging a generator, a battery in circuit with said generator and charged thereby, an electrically actuated emergency valve connected in normally open circuit to the output of said generator, means responsive to an emergency air-brake operation for closing said emergency valve circuit and for reopening upon operation of said emergency valve, a relay including a coil and spring closed contacts, open when said coil is energized, said motor being connected to a source of power through said spring closed contacts, means for energizing said coil in response to an emergency air-brake operation, means for deenergizing said coil when battery voltage decreases to less than a predetermined value, means for opening said emergency valve circuit when said coil is deenergized and means for opening said emergency valve circuit when air-brake line pressure is below a predetermined level after operation of said emergency valve.

6. A voltage supply system for a vehicle comprising a motor-generator set, a battery in circuit with said generator and charged thereby, an air brake emergency valve connected to the output of said generator, spring closed contact means including coil means for opening said contact means when said coil means is energized, said motor being connected to a power supply through said spring closed contact means, normally open contact means connecting said output to said emergency valve, fluid pressure actuated relay means including cam actuated contacts operable in a predetermined sequence, responsive to an air-brake emergency operation for energizing said coil means to open said spring closed contact means and for closing said normally open contact means, said fluid pressure actuated relay means being responsive to insufficient pressure in the emergency air-brake line to rapidly reopen said normally open contact means and to deenergize said coil means for said spring closed contacts when said battery voltage drops to a value below a preselected value.

References Cited in the file of this patent

UNITED STATES PATENTS 2,826,705   Lichtenfels et al. _____ Mar. 11, 1958